(12) United States Patent
Glennerster

(10) Patent No.: US 11,076,537 B2
(45) Date of Patent: Aug. 3, 2021

(54) PLANTER FOR GROWING PLANTS

(71) Applicant: Smart Garden Products Ltd., Abindgon (GB)

(72) Inventor: Stuart Glennerster, High Wycombe (GB)

(73) Assignee: Smart Garden Products Ltd., Abingdon (GB)

( * ) Notice: Subject to any disclaimer, the term of this patent is extended or adjusted under 35 U.S.C. 154(b) by 288 days.

(21) Appl. No.: 15/802,127

(22) Filed: Nov. 2, 2017

(65) Prior Publication Data
US 2019/0045721 A1   Feb. 14, 2019

(30) Foreign Application Priority Data

Aug. 14, 2017   (GB) ..................................... 1713024

(51) Int. Cl.
*A01G 9/02* (2018.01)

(52) U.S. Cl.
CPC ................... *A01G 9/023* (2013.01)

(58) Field of Classification Search
CPC ........ A01G 9/1423; A01G 9/16; A01G 9/023; A01G 31/06; A47G 7/041; A47B 57/00; A47B 96/06; A47B 57/20; A47B 96/066; A47B 96/063; A47B 96/067; F16B 12/00; F16B 12/42; F16B 12/26
USPC ......... 47/39, 44–47; 211/187, 190; 248/235, 248/250
See application file for complete search history.

(56) References Cited

U.S. PATENT DOCUMENTS

| | | | | |
|---|---|---|---|---|
| 3,424,178 A | * | 1/1969 | Yazaki | E04B 1/34326 135/157 |
| 4,353,663 A | * | 10/1982 | Glickman | F16B 12/20 403/230 |
| 4,426,057 A | * | 1/1984 | Nudo | A47B 61/003 108/29 |

(Continued)

FOREIGN PATENT DOCUMENTS

| CA | 2277459 | 6/2001 | ........................... 7/4 |
|---|---|---|---|
| CN | 203121567 U | 8/2013 | |

(Continued)

OTHER PUBLICATIONS

Derwent Abstract of DE 10 2013 114247 in English (attached) (Year: 2013).*

*Primary Examiner* — Peter M Poon
*Assistant Examiner* — Marisa V Conlon
(74) *Attorney, Agent, or Firm* — MacCord Mason PLLC

(57) ABSTRACT

There is provided a planter for growing plants. The planter comprises a framework supporting a plurality of shelves (16, 16a, 16b), wherein the framework comprises two upright frame members (2, 4) at a left side of the framework, two upright frame members (6, 8) at a right side of the framework opposite the left side, a first cross member (11) connected to and spanning between the two upright frame members (2, 4) at the left side of the framework, a second cross member (12) connected to and spanning between the two upright frame members (6, 8) at the right side of the framework, and a shelf support member (14) connected to and spanning between the first and second cross members (11, 12). A first end of the shelf support member (14) rests in a cradle of the first cross member (11), and is repeatedly removable and attachable therefrom.

11 Claims, 2 Drawing Sheets

(56) References Cited

U.S. PATENT DOCUMENTS

| | | | | |
|---|---|---|---|---|
| 5,207,526 A * | 5/1993 | Brustle | .................. | A47B 88/00 403/199 |
| 5,271,337 A | 12/1993 | Kolvites et al. | .............. | 108/107 |
| 5,423,251 A * | 6/1995 | Kolvites et al. | ..... | A47B 57/545 108/107 |
| 5,810,457 A * | 9/1998 | Felsenthal | ............ | A47B 43/006 108/106 |
| 6,053,465 A * | 4/2000 | Kluge | .................. | A47B 61/003 248/201 |
| 8,132,768 B2 * | 3/2012 | Fernandez | ............. | A47B 96/06 248/254 |
| 8,671,644 B2 * | 3/2014 | Huang | ................... | A47B 13/06 108/155 |
| 8,939,673 B2 * | 1/2015 | Walz | .................... | A47B 96/066 248/250 |
| 9,987,876 B1 * | 6/2018 | Tuang | ....................... | B42F 7/12 |
| 10,100,526 B2 * | 10/2018 | Knudson | ............ | A47B 47/0091 |
| 2005/0145147 A1 * | 7/2005 | Costa | ................... | A47B 47/022 108/108 |
| 2006/0055289 A1 * | 3/2006 | Wu | .................... | A47B 47/0016 312/6 |
| 2010/0107489 A1 * | 5/2010 | Silver | .................... | A47B 57/26 47/39 |
| 2010/0253196 A1 * | 10/2010 | Nye | ....................... | A47B 47/042 312/352 |
| 2011/0240571 A1 * | 10/2011 | Ho | ....................... | A47B 47/021 211/13.1 |
| 2011/0290750 A1 | 12/2011 | Lim | ................... | 211/153 |
| 2015/0305494 A1 | 10/2015 | Shah et al. | ......................... | 47/83 |
| 2018/0110346 A1 * | 4/2018 | Ott | ....................... | A47B 96/067 |
| 2018/0328396 A1 * | 11/2018 | Fransson | ................. | F16B 12/26 |
| 2019/0269082 A1 * | 9/2019 | Klein | ................... | A01G 31/06 |
| 2019/0271347 A1 * | 9/2019 | Phillips | ................... | F16B 12/26 |

FOREIGN PATENT DOCUMENTS

| | | | | |
|---|---|---|---|---|
| CN | 205993281 | | 3/2017 | ......................... 31/2 |
| CN | 206166229 | | 5/2017 | ........................... 7/4 |
| DE | 102013114247 A1 * | | 11/2014 | ............. A47B 57/20 |
| GB | 2550186 | | 11/2017 | ......................... 31/4 |
| JP | 55-54042 | | 5/2001 | |
| JP | 2002/78422 | | 3/2002 | ......................... 9/16 |
| WO | WO2015/124307 | | 8/2015 | ........................... 9/2 |

\* cited by examiner

PLANTER FOR GROWING PLANTS

The present invention relates to a planter for growing plants, in particular to a planter comprising a framework supporting a plurality of shelves, upon which plant pots can be placed.

BACKGROUND OF THE INVENTION

It is known to provide a planter comprising a framework supporting a plurality of shelves, so that pot plants can be placed upon the shelves. This provides a space-efficient method of storing and growing plants since many plants can be placed on the shelves.

However, as plants grow their heights may exceed the spaces between the shelves, requiring the plants to be moved to a different planter, or the shelves of the planter to be re-configured to provide more space. Re-configuring the shelves of a planter can be complex and time consuming, or not possible at all.

It is therefore an object of the invention to improve upon known planters.

SUMMARY OF THE INVENTION

According to the invention, there is provided a planter for growing plants. The planter comprises a framework supporting a plurality of shelves, wherein the framework comprises two upright frame members at a left side of the framework, two upright frame members at a right side of the framework opposite the left side, a first cross member connected to and spanning between the two upright frame members at the left side of the framework, a second cross member connected to and spanning between the two upright frame members at the right side of the framework, and a shelf support member connected to and spanning between the first and second cross members, wherein a first end of the shelf support member rests in a cradle of the first cross member, and is repeatedly removable and attachable therefrom.

Since the shelf support member rests in the cradle of the first cross member, it is very easy to remove the shelf support member in the event that the shelves need to be re-configured. The first end of the shelf support member may be repeatedly removable and attachable from the first cross member by virtue of the cradle, without needing to disassemble any other parts of the framework of the planter. Enabling the shelf support member to be removed means that it will not obstruct any plants growing beneath the shelf support member. Each shelf typically rests on one or more shelf support members, and the shelf could be permanently fixed to one or more of the shelf support members.

A second end of the shelf support member opposite the first end may rest in a cradle of the second cross member, similar to the first end. Alternatively, the second end of the shelf support member may be a push-fit into an aperture in the second cross member.

The cradle of the first cross member may have a narrowed portion at an entrance to the cradle, the first end of the shelf support member being retained in the cradle by the narrowed portion. The first end can be pushed past the narrowed portion to locate the first end in the cradle. The cradle may be a U-shaped cradle, and the U-shape cradle may vary in its precise shape, for example a cradle having a horizontal base and two vertical sides is still considered to be a U-shaped cradle.

The cradle of the first cross member may be positioned within a cavity of the first cross member, the cavity having an open side facing towards the second frame member and a closed side opposite from the open side. Then, the shelf support member can pass through the open side of the cavity, but is blocked from sliding along its own axis by the closed side of the cavity.

The shelf support member is used to support one of the shelves, and to help better support that shelf, the framework may further comprise a front shelf support member connected to and spanning between the first and second cross members at a front side of the framework, and a rear shelf support member connected to and spanning between the first and second cross members at a rear side of the framework. The shelf support member is located intermediate of the front shelf support member and the rear shelf support member.

The planter may comprise further first cross members, further second cross members, and further shelf support members, to support additional shelves. Typically, the shelves are spaced apart from one another along the upright members, so they are at different vertical heights to one another when the upright members are orientated vertically.

Further ones of the shelf support member may be connected to and span between the first and second cross members, the further ones of the shelf support members have first ends resting in further ones of the cradle of the first cross member, the further ones of the shelf support member being repeatedly removable and attachable to the further ones of the cradle. Accordingly, if the shelves are very deep, or are to carry a lot of weight, then the further ones of the shelf support member can be added to help support the shelf. The further ones of the shelf support member are preferably supported by the first and second cross members in exactly the same manner as the shelf support member.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
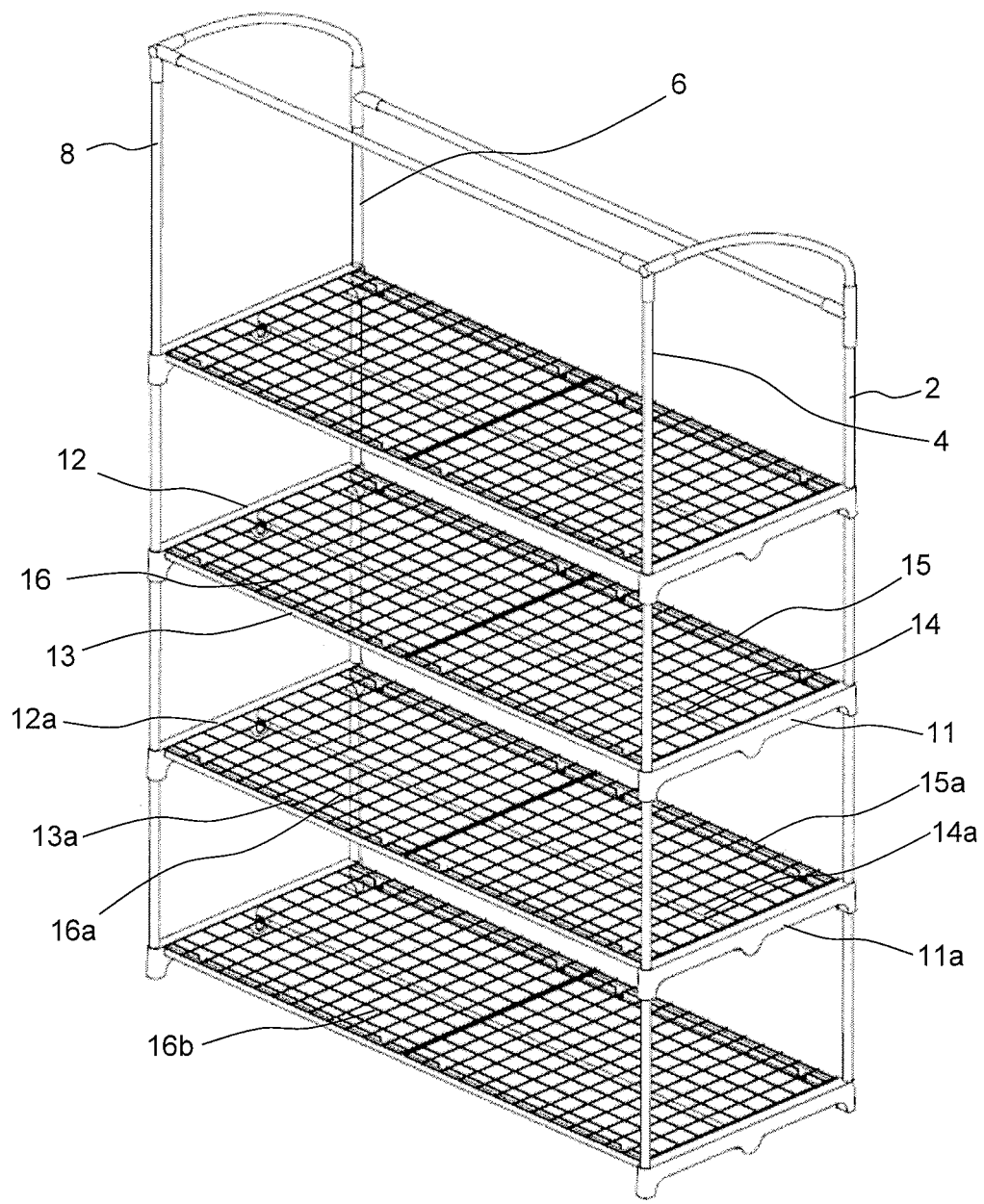
FIG. 1 shows a schematic diagram of a planter according to an embodiment of the invention.

An embodiment of the invention will now be described with reference to FIGS. 1 to 3. FIG. 1 shows a schematic diagram of a planter, which comprises a framework having four upright members in the metal rods or poles 2, 4, 6, and 8, at respective corners of the planter. The poles 2 and 4 are at the left side of the planter, and the poles 6 and 8 are at the right side of the planter. The poles 2 and 6 are at the front side of the planter, and the poles 4 and 8 are at the rear side of the planter.

The upright members 2 and 4 at the left side of the planter are connected by a plurality of first cross-members extending from the upright member 2 to the upright member 4, for example the first cross members 11 and 11a. The upright members 6 and 8 at the right side of the planter are connected by a plurality of second cross-members extending from the upright member 6 to the upright member 8, for example the second cross members 12 and 12a.

The first and second cross members are formed from metal, and are shaped so that shelf support members can be connected from each first cross member to a respective second cross member, for supporting shelves. For example, the shelf support member 14 extends from the first cross member 11 to the second cross member 12, and the shelf support member 14a extends from the first cross member 11a to the second cross member 12a. Similarly, front shelf support members 15 and 15a extend between those first and second cross members at the front side of the planter, and rear shelf support members 13 and 13a extend between those first and second cross members at the rear side of the planter. The shelf support members are also made of metal, however the upright members, cross members, and shelf support members could be made of alternate materials such as rigid plastics in alternate embodiments.

A shelf 16 rests upon shelf support members 13, 14, and 15, and a shelf 16a rests upon shelf support members 13a, 14a, and 15a. The shelves are formed of a metal mesh which is substantially transparent, to allow transmission of light therethrough. The shelves are removable from at least the front and back shelf support members 13, 13a, 15, 15a, since those shelf support members are permanently attached to the first and second cross members. Depending on the particular embodiment, the shelves may also be removable from the shelf support members 14 and 14a, or alternatively the shelf support members 14 and 14a may remain as part of the shelves when the shelves are removed from the planter for reconfiguring the positions of the shelves. For example the shelf 16a could be removed from the planter to provide more room for plants growing on the shelf 16b below it, and if necessary the shelf 16 could be removed as well to provide even more room for the plants.

The shelf support member 14 is removable from the first and second cross members 11 and 12, and the shelf support member 14a is removable from the first and second cross members 11a and 12a. Then, the shelf support members can be removed as well as the shelves, so that the shelf support members will not get in the way of plants growing on the shelf beneath them. The first and second cross members are orientated horizontally when the upright members are oriented vertically. The first and second cross members each comprise a cradle for connecting a shelf support member in an easily removable manner, as will now be described with reference to FIGS. 2 and 3.

Figure 2:
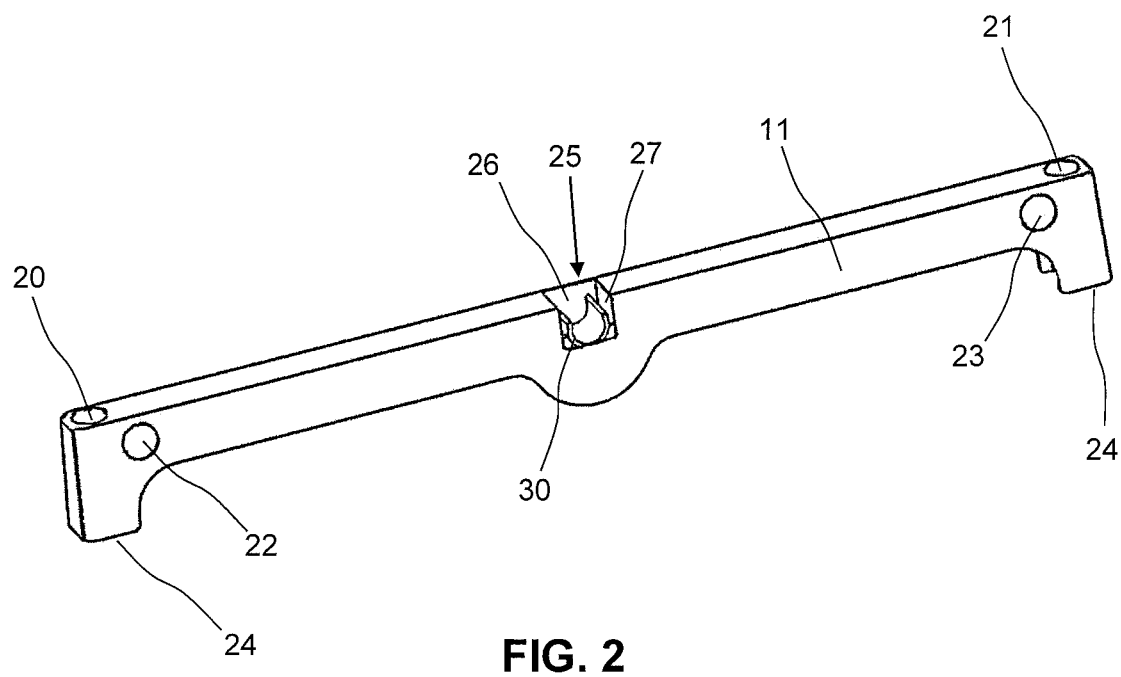
FIG. 2 shows a schematic diagram of a cross member of the planter shown in FIG. 1.
Figure 3:
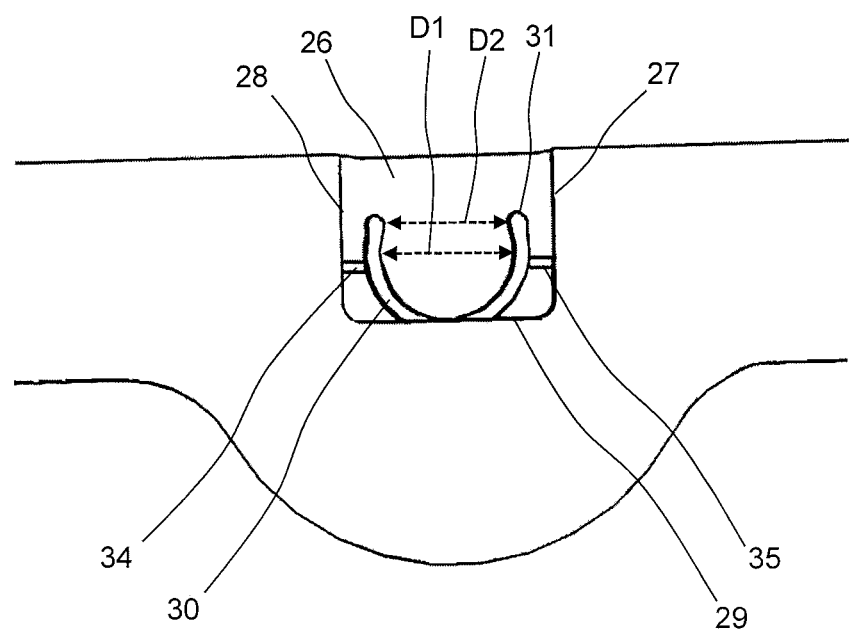
FIG. 3 shows a schematic diagram of a U-shaped cradle of the cross member shown in FIG. 2.

The schematic diagram of FIG. 2 shows the first cross member 11. In this particular embodiment, the other first cross members and the second cross members are all the same as the cross member 11. The first cross member 11 comprises a length of tubing with feet 24 extending perpendicular to the length of tubing at opposing ends of the tubing. The feet 24 provide a base for the planter to stand on when the cross members is used for the bottom shelf of the planter. In this embodiment, the tubing has a rectangular cross-section, although the cross section of the tubing could be curved in alternative embodiments.

A first end of the cross member 11 goes at the front side of the planter and has a hole 20 passing vertically through it, which receives the upright member 2. A second end of the cross member 11 goes at the rear side of the planter and has a hole 21 passing vertically through it, which receives the upright member 4. The first end of the cross member 11 also has a blind hole 22 extending horizontally into the cross member, perpendicular to the length of tubing, for receiving the front shelf support member 15. The second end of the cross member 11 also has a blind hole 23 extending horizontally into the cross member, perpendicular to the length of tubing, for receiving the rear shelf support member 13.

The cross member 11 comprises a cradle 30 located mid-way along the cross member, so that the cross member 11 is symmetrical and can easily be used as either a first cross member or a second cross member. The cradle 30 is a U-shape which removably receives the shelf support member 14. The cradle 30 is located inside a cavity 25 that is formed in a side of the tubing of the cross member 11, and the cavity comprises a closed side 26 and an open side opposite the closed side, the open side facing towards the cross member 12 and allowing the shelf support member 14 to pass into the cavity to the cradle. The closed side 26 prevents the shelf support member 14 from sliding out beyond the left side of the planer, and so keeps the shelf support member 14 in its correct position. The cavity also has sides 27 and 28 (see FIG. 3) which each extend perpendicular to the length of tubing, from the open to the closed side of the cavity.

The cavity also has an open top, and a closed bottom 29 opposite the open top, the open top allowing the shelf support member 14 to be easily lowered into the cradle 30. To help support the cradle 30, a rib 34 extends from the side 28 of the cavity to a first side of the cradle, and a rib 35 extends from the side 27 of the cavity to a second side of the cradle, the first and second sides of the cradle being opposite to one another.

The cradle 30 is open at its top, and it has a narrowed portion 31 at its top so that the distance D2 across the top of the cradle is slightly smaller than the distance D1 between the first and second sides of the cradle. The distance D2 is marginally smaller than a width of the shelf support member 14 so that the shelf support member 14 can snap past the narrowed portion 31 and be retained between the sides of the cradle when connecting the shelf support member 14 to the cross member 11. The shelf support member 14 has a circular cross section to aid in forcing it past the narrowed portion 31, during both connection of the shelf support member 14 to the cross member 11 and removal of the shelf support member 14 from the cross member 11.

Due to the cradle 30, it is very easy to connect and remove the shelf support member 14 to and from the cross member 11. The cradle 30 comprises two arms which form the two respective sides of the cradle, and the arms are flexible so they can slightly separate from one another to allow the shelf support member 14 to snap past the narrowed portion 31. The cradle 30 may for example be formed of a flexible plastics material, for example by moulding.

In alternative embodiments, further ones of the shelf support member 14 may be added to span between the first and second cross members 11 and 12, to help the support the shelf 16. In that case, the first and second cross members 11 and 12 are provided with cradles for supporting the further ones of the shelf support member 14, of the same type as the cradles that support the shelf support member 14. The shelf support member 14 and further ones of the shelf support member 14 are spaced at regular intervals along the lengths of the first and second cross members 11 and 12.

In an alternate embodiment, the first cross members may all be the same as the cross-member 11, however each second cross member has a simple blind hole for receiving the shelf support member instead of the cradle 30, for example a blind hole similar to the blind holes 22 or 23. Then when adding a shelf support member, the second end of the shelf support member can be slide into the blind hole of the second cross member, and the first end of the shelf support member can be pushed downwardly into the cradle 30 of the first cross member.

Many other variations of the described embodiments falling within the scope of the invention will be apparent to those skilled in the art.

The invention claimed is:

1. A planter for growing plants, the planter comprising a framework supporting a plurality of shelves, wherein the framework comprises two upright frame members at a left side of the framework, two upright frame members at a right side of the framework opposite the left side, a first cross member connected to and spanning between the two upright frame members at the left side of the framework, a second cross member connected to and spanning between the two upright frame members at the right side of the framework, and a shelf support member connected to and spanning between the first and second cross members, wherein a first end of the shelf support member rests in a cradle of the first cross member, and is repeatedly removable and attachable therefrom, wherein the first cross member is a length of tubing, wherein the cradle comprises a first flexible arm defining a first side of the cradle and a second flexible arm defining a second side of the cradle, wherein the first and second flexible arms define a narrowed portion at an entrance of the cradle, wherein the cradle is positioned within a cavity inside the length of tubing, the cavity having an open side facing towards the second cross member, a closed side opposite from the open side, wherein the first cross member has an open top defining an entrance into the cavity which allows the shelf support member to be lowered from above the first cross member into the cradle, the first and second flexible arms configured to flex apart from one another as the shelf support member snaps past the narrowed portion at the entrance to the cradle, the cavity comprising a closed bottom opposite from the open top, and first and second sides that are opposite to one another with two separate ribs that are above the closed bottom of the cavity, one of the ribs extending from the first side of the cavity to the first flexible arm of the cradle and the other of the ribs extending from the second side of the cavity to the second flexible arm of the cradle.

2. The planter of claim 1, wherein a second end of the shelf support member rests in a cradle of the second cross member, and is repeatedly removable and attachable therefrom, the second end of the shelf support member being an opposite end of the shelf support member from the first end of the shelf support member.

3. The planter of claim 1, wherein the cradle of the first cross member has a narrowed portion at an entrance to the cradle, the first end of the shelf support member being retained in the cradle by the narrowed portion.

4. The planter of claim 1, wherein the cradle of the first cross member is a U-shaped cradle.

5. The planter of claim 1, wherein the framework further comprises a front shelf support member connected to and spanning between the first and second cross members at a front side of the framework, and a rear shelf support member connected to and spanning between the first and second cross members at a rear side of the framework, wherein the shelf support member is located intermediate of the front shelf support member and the rear shelf support member.

6. The planter of claim 5, wherein the front shelf support member and the rear shelf support member are permanently fixed between the first cross member and the second cross member.

7. The planter of claim 5, wherein a first shelf of the plurality of shelves is supported by the rear shelf support member, the shelf support member, and the front shelf support member.

8. The planter of claim 1, wherein the shelf support member is connected to the first cross member mid-way between the two upright frame members at the left side of the framework, and the shelf support member is connected to the second cross member mid-way between the two upright frame members at the right side of the framework.

9. The planter of claim 1, wherein the framework further comprises a further first cross member connected to and spanning between the two upright frame members at the left side of the framework, a further second cross member connected to and spanning between the two upright frame members at the right side of the framework, and a further shelf support member connected to and spanning between the further first and further second cross members, wherein a first end of the further shelf support member rests in a U-shaped cradle of the further first cross member, and is repeatedly removable and attachable therefrom.

10. The planter of claim 1, wherein the plurality of shelves are formed of a metal mesh to allow transmission of light through the shelves.

11. The planter of claim 1, wherein a further shelf support member is connected to and spans between the first and second cross members, wherein a first end of the further shelf support member rests in a further cradle of the first cross member, and is repeatedly removable and attachable therefrom, wherein the further cradle is positioned within a further cavity inside the length of tubing that is the first cross member, the further cavity having an open side facing towards the second cross member, a closed side opposite from the open side, and an open top allowing the further shelf support member to be lowered into the further cradle.

* * * * *